(12) United States Patent
Tsai

(10) Patent No.: US 7,144,504 B2
(45) Date of Patent: Dec. 5, 2006

(54) COMPACT WATER FILTER FOR CLEANING POOL WATER

(76) Inventor: Lung-Po Tsai, 27F, No. 29-3, Sec. 2, Chung-Cheng E. Rd., Tan-Shui Chen, Taipei Hsien (TW)

( * ) Notice: Subject to any disclaimer, the term of this patent is extended or adjusted under 35 U.S.C. 154(b) by 453 days.

(21) Appl. No.: 10/759,068

(22) Filed: Jan. 20, 2004

(65) Prior Publication Data

US 2005/0155165 A1    Jul. 21, 2005

(51) Int. Cl.
*B01D 35/26* (2006.01)

(52) U.S. Cl. .................................. 210/416.2; 417/360

(58) Field of Classification Search ................ 417/360; 210/416.1, 416.2, 169; 415/121.2
See application file for complete search history.

(56) References Cited

U.S. PATENT DOCUMENTS 4,349,434 A * 9/1982 Jaworski ....................... 210/94

5,958,237 A * 9/1999 Cort et al. ............... 210/416.4

* cited by examiner

*Primary Examiner*—Terry K. Cecil
(74) *Attorney, Agent, or Firm*—Bacon & Thomas

(57) ABSTRACT

A compact water filter includes a housing, a filter and a water pump. The housing includes a bottom container and a pump casing. The bottom container has a top cavity and a water inlet communicating with the top cavity. The pump casing is mounted on the bottom container to cover the top cavity and has a water discharge port. The filter is mounted and held in the top cavity of the bottom container to remove contaminants from incoming water. The water pump is mounted in the housing to pump water into and out of the water filter through the water inlet and the water discharge port. Consequently, the water filter holds most of the pool water in the bottom container to lower the center of gravity of the water filter to keep the water filter from overturning when the water filter is operating.

3 Claims, 5 Drawing Sheets

COMPACT WATER FILTER FOR CLEANING POOL WATER

BACKGROUND OF THE INVENTION

1. Field of the Invention

The present invention relates to a compact water filter, and more particularly to a compact water filter for cleaning pool water, such as recycling dirty swimming pool water.

2. Description of Related Art

A swimming pool typically uses a water filtration system to clean pool water so that contaminated water in the pool can be recycled to save water. However, water filtration systems are generally very large and have a complex structure. Therefore, large water filtration systems are expensive and are typically used for public or institutional swimming pools.

Private or backyard swimming pools are generally much smaller than public or institution swimming pools. Large water filtration systems are not economic for such small swimming pools. A compact water filter is suitable for a small swimming pool to clean the pool water so the pool water can be recycled to save water.

With reference to FIGS. 4 and 5, a conventional compact water filter in accordance with prior art comprises a mounting housing (30), a cap (33), a filter (41) and a water pump assembly (not numbered). The mounting housing (30) has a top (not numbered), a bottom (not numbered), a top cavity (301), a bottom cavity (302), a mounting lip (303) and a water inlet (304). The top cavity (301) is defined in the top and has a bottom (not numbered). The bottom of the top cavity (301) has a center (not numbered), an annular rib (306) and a through hole (305). The annular rib (306) is integrally formed at the center of the bottom. The through hole (305) is defined through the bottom in the annular rib (306) to allow the top cavity (301) to communicate with the bottom cavity (302). The bottom cavity (302) is defined in the bottom of the mounting housing (30). The mounting lip (303) protrudes radially at the bottom of the mounting housing (30) and has multiple mounting holes (307). The water inlet (304) communicates with the top cavity (301) to allow contaminated pool water to enter the top cavity (301).

The filter (41) is partially mounted in the top cavity (301) around the annular rib (306) to remove contaminant from the incoming water. The cap (33) is attached to the top of the mounting housing (30), covers the top cavity (301) and has a bottom cavity (331) that holds the filter (41).

The water pump assembly is mounted in the bottom cavity (302) and comprises a water pump (40), a U-shaped clamp (42) and a threaded seal (43). The pump (40) has a water inlet (401) and a water outlet (402). The water inlet (401) is mounted and held in the through hole (305) and has a top end (not numbered) extending out of the through hole (305). The water outlet (402) laterally extends out of the mounting housing (30). The clamp (42) firmly holds the pump (40) in place in the bottom cavity (302). The threaded seal (43) screws on the extended top end of the water inlet (401) to prevent water from leaking through the though hole (305).

When the pump (40) is started, the pool water is sucked into the top cavity (301) of the mounting housing (30) and the bottom cavity (331) of the cap (33) through the water inlet (304). Incoming water passes through the filter (41) to remove contaminants from the water and enters into the pump (40) through the water inlet (401). The pump (40) pumps the clean water out of the water filter through the water outlet (402) to the pool to recycle the pool water.

Since most of the pool water in the water filter is in the top cavity (301) of the mounting housings (30) and the bottom cavity (331) of the cap (33), the center of gravity of the water filter is high, and the water filter must be held in place with fasteners (not shown) to keep the water filter from overturning. Therefore, this kind of water filter needs to be attached to a stationary base (not shown) with fasteners such as bolts. The conventional compact water filter is inconvenient to use because the water filter is not easy to move after the water filter is mounted. A long suction hose must be connected to the fixed water filter to reach all areas of the pool. If the suction hose is too long, the pool water cannot be efficiently drawn into the water filter because the power of the pump (40) is limited. The water filter cannot completely clean the pool water.

To overcome the shortcomings, the present invention provides an improved compact water filter to mitigate or obviate the aforementioned problems.

SUMMARY OF THE INVENTION

The main objective of the invention is to provide a compact water filter that does not have to be attached to a given position so the water filter can be moved conveniently to any position around a poor to clean pool water.

A compact water filter includes a housing, a filter and a water pump. The housing includes a bottom container, a pump casing and a packing ring. The bottom container has a top cavity and a water inlet communicating with the top cavity. The pump casing is mounted on the bottom container to cover the top cavity and has a water discharge port. The packing ring fastens the bottom container and the pump casing together. The filter is mounted and held in the top cavity of the bottom container to remove contaminants from the water coming through the water inlet. The water pump is mounted in the housing to suck the water through the water inlet and pump the clean water out of the water filter through the water discharge port. Consequently, most of the pool water in the water filter is in the bottom container, which lowers the center of gravity of the water filter. The water filter will be stable and does not need to be attached to a surface to keep the water filter from overturning when the water filter is operating.

Other objectives, advantages and novel features of the invention will become more apparent from the following detailed description when taken in conjunction with the accompanying drawings.

DETAILED DESCRIPTION OF PREFERRED EMBODIMENT

Figure 1:
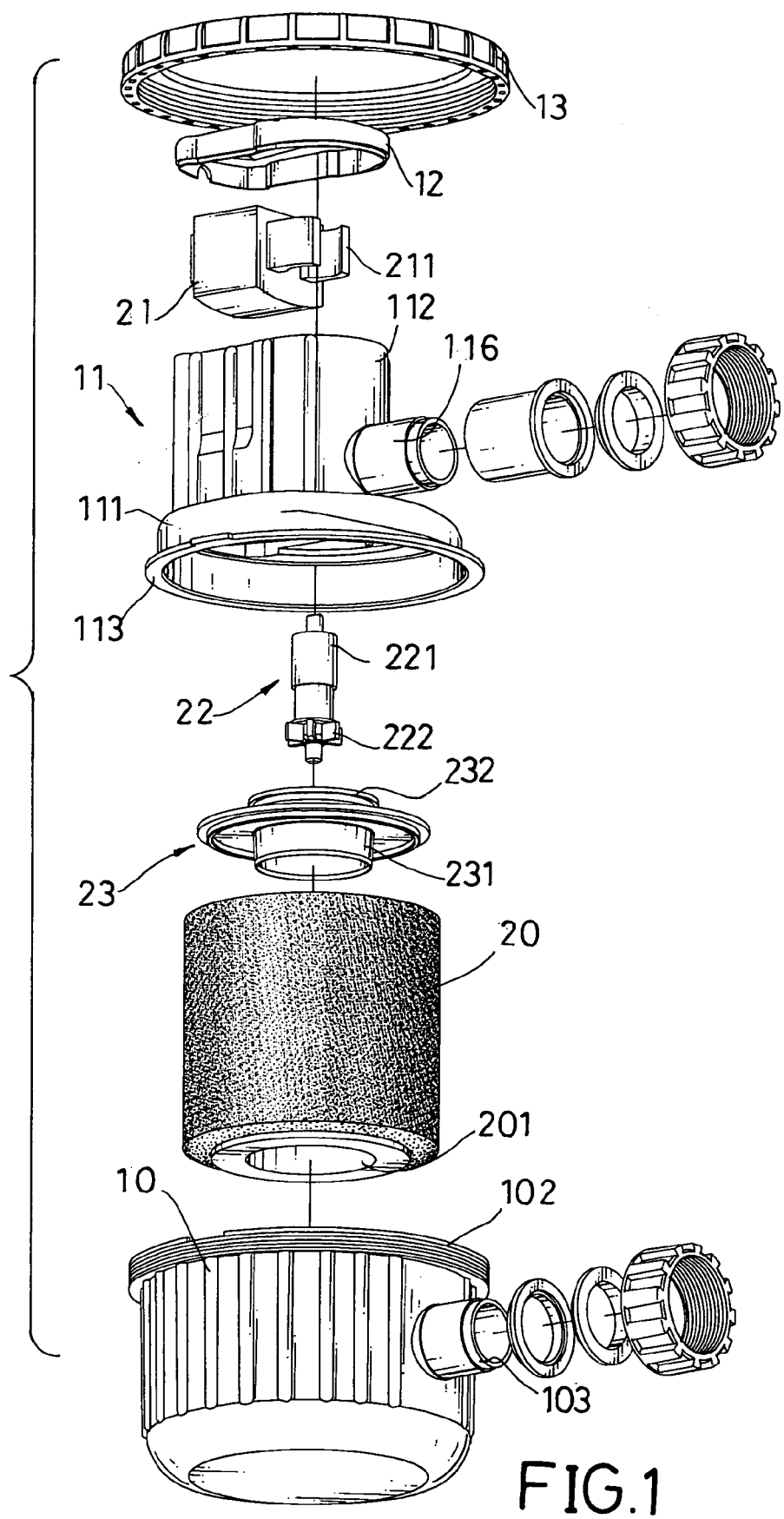
FIG. 1 is an exploded perspective view of a compact water filter in accordance with the present invention.
Figure 2:
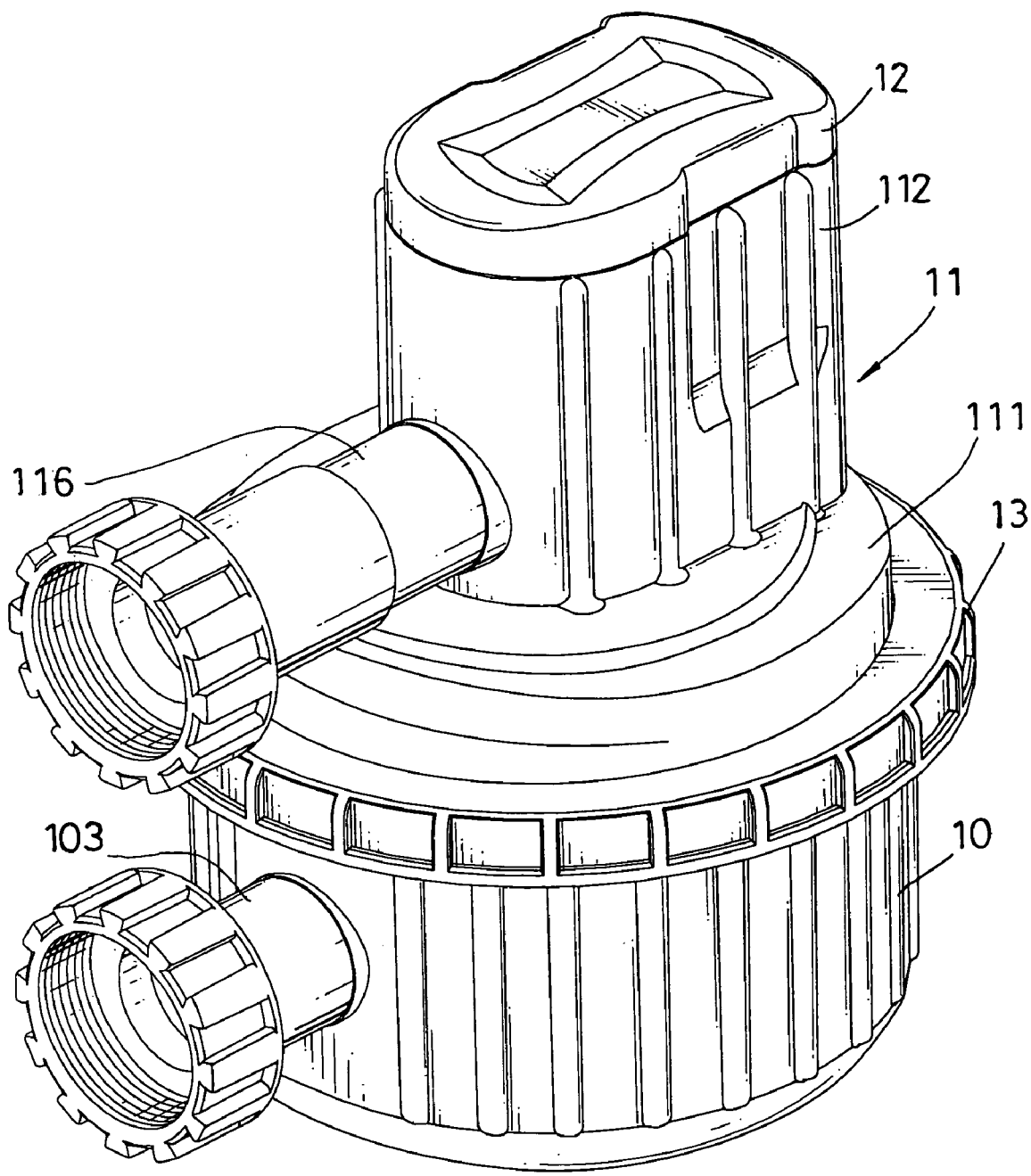
FIG. 2 is a perspective view of the compact water filter in FIG. 1.
Figure 3:
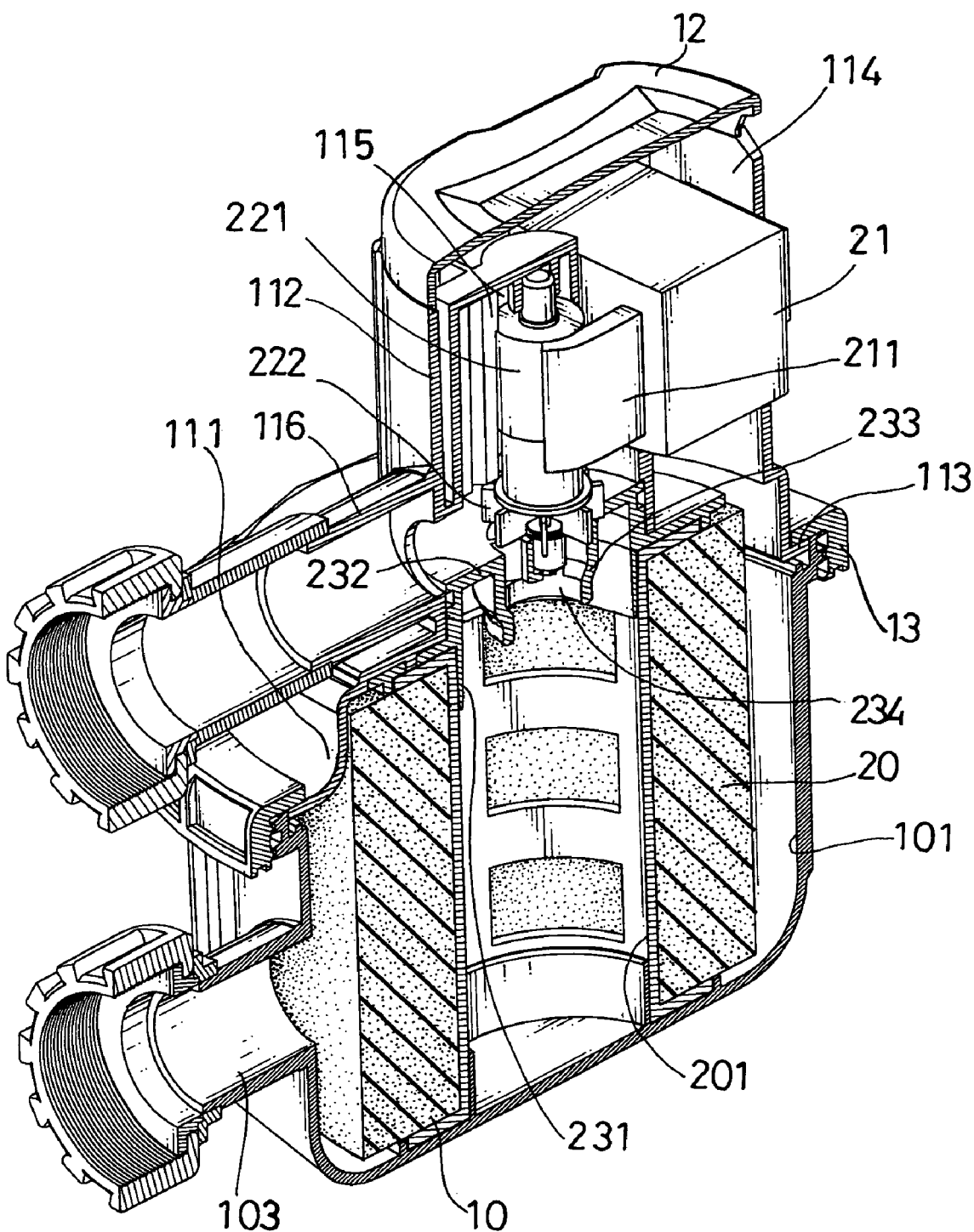
FIG. 3 is a perspective view in partial section of the compact water filter in FIG. 2.
Figure 4:
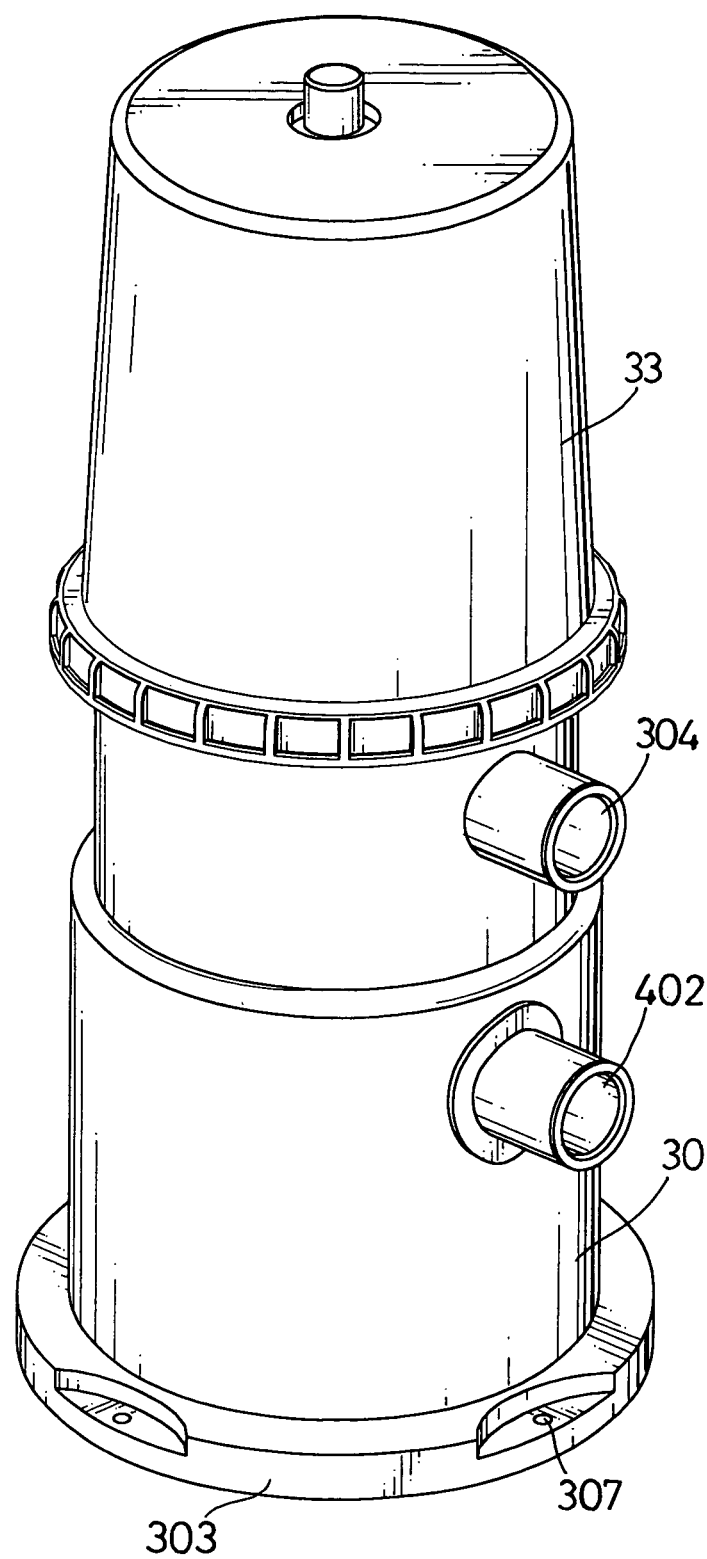
FIG. 4 is a perspective view of a conventional compact water filter in accordance with prior art.
Figure 5:
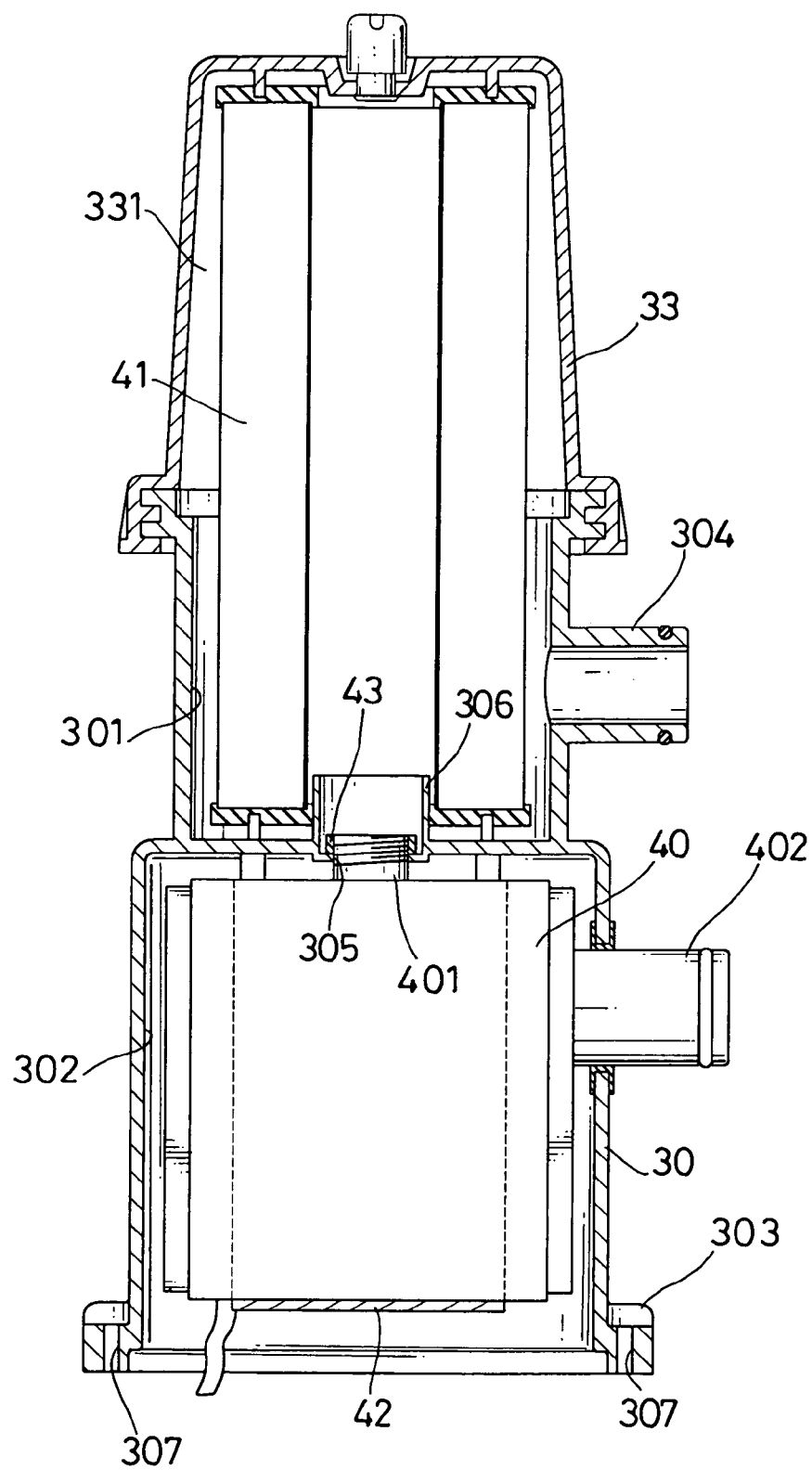
FIG. 5 is a side plan view in partial section of the compact water filter in FIG. 4.

With reference to FIGS. 1, 2 and 3, a compact water filter in accordance with the present invention comprises a housing (not numbered), a filter (20) and a water pump (not numbered).

The housing comprises a bottom container (10), a pump casing (11), a packing ring (13) and a cap (12). The bottom container (10) has a top (not numbered), a top cavity (101), an exterior thread (102) and a water inlet (103). The top cavity (101) is defined in the top. The exterior thread (102) is formed around the top. The water inlet (103) communicates with the top cavity (101) to allow pool water to enter the bottom container (10).

The pump casing (11) is mounted around the top of the bottom container (10) to cover the top cavity (101) and comprises a volute (111) and top casing (112). The volute (111) covers the top cavity (101) and has a top (not numbered), a bottom (not numbered) and an annular lip (113). The bottom has an outer edge (not numbered). The annular lip (113) is formed radially along the outer edge. The top casing (112) protrudes from the top of the volute (111) and has a top driver chamber (114), a bottom impeller chamber (115) and a water discharge port (116). The top driver chamber (114) is isolated from the bottom impeller chamber (115). The water discharge port (116) communicates with the impeller chamber (115).

The packing ring (13) is mounted around the top of the bottom container (10) and has an interior thread (not numbered). The interior thread screws onto the exterior thread (102) on the bottom container (10) and simultaneously clamps the annular lip (113) of the volute (111) to fasten the bottom container (10) to the pump casing (11). The cap (12) covers and closes the top driver chamber (114).

The filter (20) is mounted and held in the top cavity (101) of the bottom container (10) and has a top (not numbered) and an axial hole (201).

The water pump is mounted in the pump casing (11) of the housing and comprises a driver (21), an impeller (22) and an impeller holder (23). The driver (21) is mounted in the top driver chamber (114) and has two driver field windings (211). The driver field windings (211) are mounted around the isolated bottom impeller chamber (15) in the top driver chamber (114).

The impeller holder (23) is attached to the top of the filter (20) and has an annular bottom rib (231) and a top cap (232). The annular bottom rib (231) extends into and is held in the axial hole (201) of the filter (20) to hold the impeller holder (23) in place. The top cap (232) is formed coaxially with the annular bottom rib (231) and has a top (not numbered) and an inward protrusion (233). The inward protrusion (233) protrudes inside the top cap (232) from the top and has a volute inlet (234) that communicates with the axial hole (201) in the filter (20).

The impeller (22) is rotatably mounted in the bottom impeller chamber (115) and comprises a vertical shaft (221) and multiple vanes (222). The vertical shaft (221) is rotatably mounted in the bottom impeller chamber (115) and has a bottom end (not numbered). The bottom end extends into and is held in the volute inlet (234). The vanes (222) are attached to the bottom end of the vertical shaft (221) above the volute inlet (234) to pump the clean water into the water discharge port (116) from the volute inlet (234) as the vertical shaft (221) rotates.

The pool water in the bottom container (10) of the water filter lowers the center of gravity of the water filter. Consequently, the water filter is stable, does not need to be attached to a stationary object and does not overturn easily when the water filter is operating. The water filter can be moved easily and conveniently to any position around the pool to clean the pool water, which means a long suction hose is unnecessary. The pump assembly effectively sucks the pool water into the water filter to clean the pool water.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the scope of the appended claims.

What is claimed is:

1. A compact water filter comprising:
   a housing comprising
      bottom container having a top, a top cavity defined in the top and a water inlet communicated with the top cavity;
      a pump casing mounted on the top of the bottom container and comprising
         a volute mounted on the top of the bottom container to cover the top cavity and having a top; and
         a top casing protruding from the top of the volute and having a top driver chamber, a bottom impeller chamber isolated from the top driver chamber and a water discharge port communicating with the bottom impeller chamber;
      a cap attached to the top casing to cover and close the top driver chamber; and
      a packing ring mounted around the top of the bottom container to fasten the bottom container to the volute of the pump casing;
   a filter mounted and held in the top cavity of the bottom container and having a top and an axial hole; and
   a water pump mounted in the pump casing of the housing and comprising
      a driver mounted in the top driver chamber and having two driver field windings mounted in the top driver chamber around the bottom impeller chamber;
      an impeller holder attached to the top of the filter and having a volute inlet communicating with the axial hole in the filter; and
      an impeller rotatably mounted in the bottom impeller chamber and comprising a vertical shaft with a bottom end rotatably mounted in the bottom impeller chamber and multiple vanes, the bottom end of the vertical shaft extended into and held in the volute inlet, and the vanes attached to the bottom end of the vertical shaft to pump water into the water discharge port from the volute inlet as the vertical shaft rotates.

2. The compact water filter as claimed in claim 1, wherein the impeller holder further has
   an annular bottom lip extended into and held in the axial hole of the filter to hold the impeller holder in place; and
   a top cap coaxially formed with the annular bottom lip and having a top and an inward protrusion protruding inside the top cap from the top;
   wherein the volute inlet is longitudinally defined through the inward protrusion.

3. The compact water filter as claimed in claim 2, wherein
   the volute further has a bottom with an outer edge and an annular lip radially formed around the outer edge;
   the bottom container further has an exterior thread formed around the top; and
   the packing ring further has an interior thread that screws onto the exterior thread on the bottom container and simultaneously clamps the annular lip of the volute to fasten the bottom container to the pump casing.

* * * * *